3,573,181
ELECTROLYTIC REDUCTION OF IRON

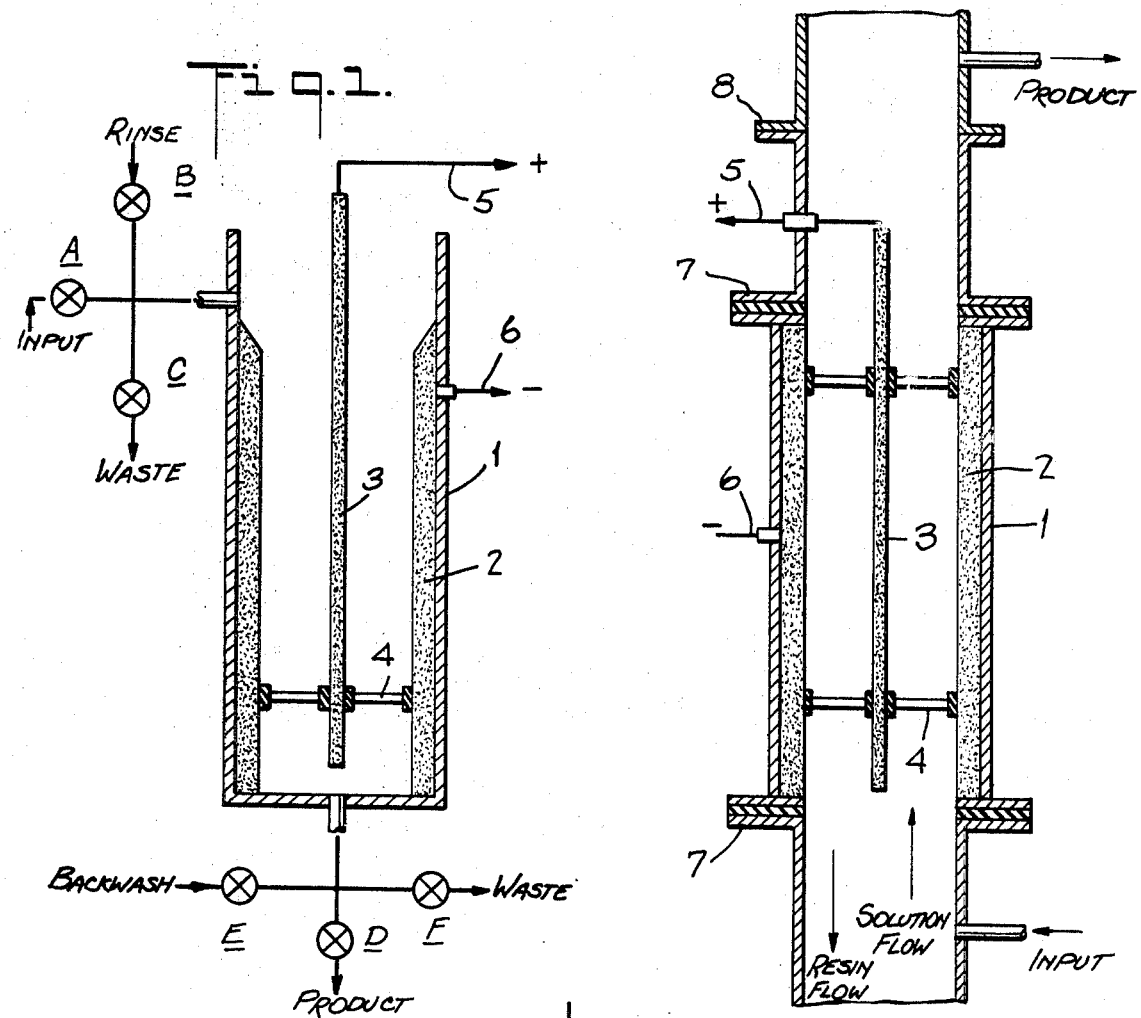
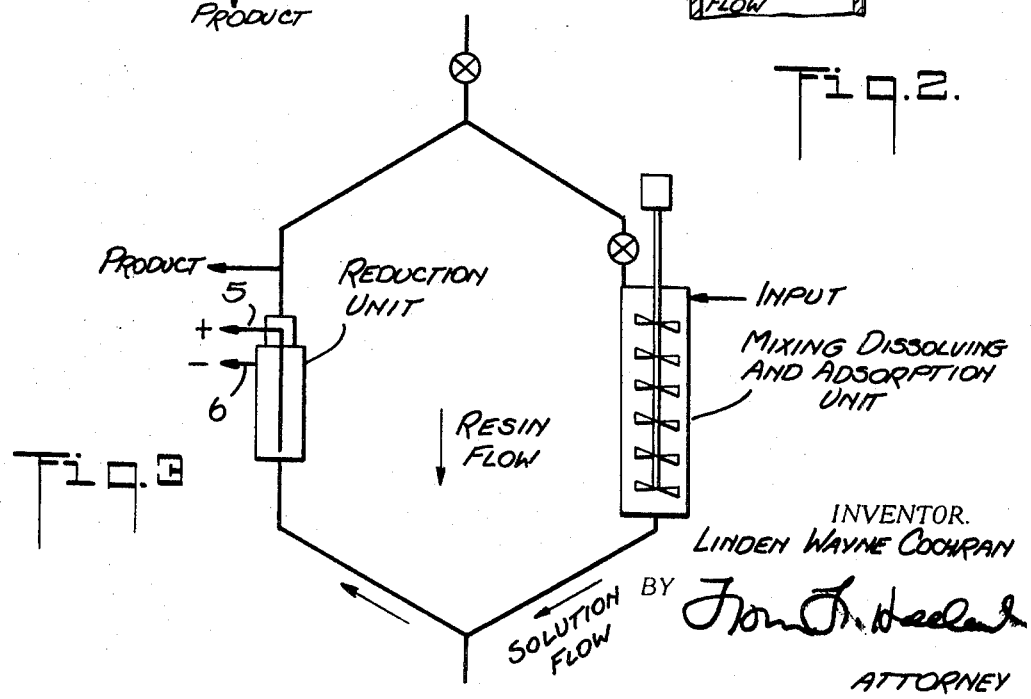

Linden W. Cochran, Basking Ridge, N.J., assignor to Multi-Minerals Limited, Toronto, Ontario, Canada
Filed Feb. 7, 1968, Ser. No. 703,648
Int. Cl. B01k 1/00
U.S. Cl. 204—103          6 Claims

ABSTRACT OF THE DISCLOSURE

The present invention is directed to the reduction of multivalent cations in acidic solutions, such as phosphate solutions, to a lower oxidation state by electrolysis of the solution and capture of the cation in said lower oxidation state by an ion exchange resin.

---

The present invention relates to the chemical reduction of multivalent cations, such as $Fe^{+3}$, contained in salt solutions, such as acidic phosphate solutions, to the $Fe^{+2}$ oxidation state and to the method for the retention of the $Fe^{+2}$ ion in that $+2$ oxidation state until it is adsorbed by an ion exchange resin, is already disclosed in my pending application entitled Acid Regeneration filed on Sept. 13, 1967, Ser. No. 667,367.

In said application it is stated that any suitable chemical reductant, such as iron powder, hydrogen sulfide ($H_2S$), or sulfur dioxide ($SO_2$), may be employed to reduce the $Fe^{+3}$ to the $Fe^{+2}$ oxidation state.

The present invention is an improvement over said method and has for an objective the partial reduction of the ion to an oxidation state other than the metallic state and the removal of the reduced ion from the solution by an ion exchange resin system.

For example, in a system composed of multivalent $Fe^{+3}$, all of the ions in the solution, with the exception of the $Fe^{+3}$ are readily adsorbed onto the ion exchange resin. It is only necessary to convert the $Fe^{+3}$ to the $+2$ oxidation state so as to facilitate its recovery by the resin. Hence, a partial electrolysis procedure is required to reduce $Fe^{+3}$ to $Fe^{+2}$. However the electrolysis must not go to completion to avoid reduction of the $Fe^{+3}$ to the metallic state ($Fe^0$).

Available literature offers little information for the procedures to be employed in order to effect a partial reduction of cations in solution to a state above the metallic state. The teachings are generally directed to total electrolysis which results in removal of the ions by deposition on a suitable electrode. During such a procedure the solution will contain ions in every state of oxidation from the highest to the lowest state, with those in the metallic state being deposited on the cathode. The literature is silent on the conditions necessary for selective reduction of an ion from a higher to a lower state of oxidation without metal deposition.

This invention provides the removal of cation contaminants from acidic salt solutions by means of an ion exchange resin in which said cations have been reduced to a lower oxidation state.

It is also an object of this invention to provide for a means to remove multivalent cations from acidic solution by electrolysis of the solution without having said cations reduced to their metallic state.

It is a further object of this invention to provide a more efficient process for removal of cations from acidic solutions.

It is another object of this invention to provide an electrode-resin apparatus which can be used to remove multivalent cations from solution by electrolysis without having said cations reduced to their metallic form.

It is a further object of this invention to provide an electrode-resin apparatus that is particularly useful in purifying acidic phosphate solutions of $Fe^{+3}$ and other multivalent cations that are very difficult or impossible to remove by means of ion exchange resins.

These and other objects of this invention will become apparent to one skilled in the art upon a reading of this specification and the appended claims.

It is another object of this invention to provide an electrode-resin apparatus which is readily adaptable to the so-called fixed-bed, semi fixed-bed, and continuous ion exchange systems.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a diagrammatic view showing the practice of the invention in a fixed-bed system;

FIG. 2 is a diagrammatic view showing the practice of the invention in a continuous system; and FIG. 3 is a diagrammatic view showing the use of the invention for a continuous ion exchange unit.

It has been found that if the electrolytic reduction of $Fe^{+3}$ to $Fe^{+2}$ is performed in the presence of a strong acid ion exchange resin in the H+ cycle, the $Fe^{+3}$ is not reduced to metallic iron. Such a resin has a strong affinity for divalent iron, so that, as the $Fe^{+3}$ ions are reduced to the $+2$ state, the resin promptly adsorbs them and prevents their final reduction to the metallic form.

The ion exchange column is provided with an anode and a cathode electrode, as is usual in electrolysis. The column contains a suitable strong acid resin in the H+ form. The water in which the resin is normally suspended is preferably replaced with pure acid of the same concentration as the impure acid containing the cations to be reduced. The impure acid that contains ferric ions is then run over the resin while a constant voltage is passed through the resin bed between the electrodes. With this system the $Fe^{+3}$ is reduced to $Fe^{+2}$ by electrolysis. The $Fe^{+2}$ ions are immediately picked up by the resin so that further reduction is prevented. Simultaneously the phosphate is being converted to phosphoric acid by the ion exchange resin. Hence, phosphoric acid is formed and the $Fe^{+3}$ and $Fe^{+2}$ ion contaminant is removed in a single step.

Applicant has discovered that a pure phosphoric acid is obtained by digesting apatite or, other phosphate containing rock, with phosphoric acid. Monocalcium orthophosphate crystals are then allowed to form and are removed from the mother liquor. The crystals are then contacted with a strong acid ion exchange resin on the H+ cycle in order to convert the monocalcium orthophosphate to pure phosphroic acid.

It is during the contacting of the crystals with the ion exchange resin that it is desirable to remove any $Fe^{+2}$ cations. By modifying existing ion exchange beds so that they include a cathode and an anode and by allowing a current to go from one to the other, the $Fe^{+3}$ is reduced electrolytically to $Fe^{+2}$ and the $Fe^{+2}$ is immediately picked up by the ion exchange resin so that further reduction to metallic iron is avoided.

The present invention requires that certain simple modifications be made in existing apparatus, such as the one shown in U.S. Ser. No. 667,367, filed Sept. 13, 1967, namely, the incorporation of anode and cathode electrodes.

Preferably, the cathode electrode is made a part of the ion exchange column which supports and contains the resin bed. This provides a maximum surface for contact between the resin and the electron emitting source. It also has the added advantage of keeping the shell at ground potential so that the hazard of shock is eliminated and the problem of insulation is simplified.

The anode and cathode electrodes should be made of materials that are not attacked by the acid solution and that will not ionize under the influence of the electric current. Preferably the parts should be made of carbon or impervious graphite.

FIG. 1 shows a suitable arrangement of the new electrode system for a fixed-bed ion exchange system. A supporting shell 1 is provided to give structural strength to the inner shell 2 which serves as the cathode electrode. The supporting shell 1 can consist of stainless steel, plastic, glass or any other material of construction which will provide support and will not be attacked by the acid medium.

The inner shell or cathode electrode 2 will be made of any suitable material such as carbon, impervious graphite, etc. The anode electrode 3 will ordinarily be made of the same material as the cathode 2 and is suspended within the cathode electrode 2 and centrally mounted, by any suitable means such as an insulated supporting ring 4. The ring 4 will provide additional structural stability and forestall possible short circuits. Suitable connectors 5 and 6 for the necesary electrical power are provided.

The cathode 2 can be either a single integral unit, cast or otherwise formed, or it can be fabricated much in the fashion of a furnace wall from bricks made of the cathode material. Whichever approach is utilized will be dictated by the dimensions and characteristics of the ion exchange unit. In any event, the wall should be as impervious and as free of spaces as possible in order to avoid pockets for the solution and eluate to accumulate and contaminate the subsequent solution.

Valves A through F shown in FIG. 1 are the normal components associated with an ion exchange column and their employment is no different from that of a normal unit.

The adoption of the present invention to a semi-fixed bed system where the resin is moved from one column to another for the various steps of loading, washing, back-washing and eluding can be readily accomplished by adapting each of the loading columns to the construction shown in FIG. 1.

FIG. 2 shows the modification of a continuous system so as to accomplish the reduction-absorption step in the manner disclosed. In this instance, it is desirable for the electrolysis unit to be self-contained so that it can be readily removed from the column for inspection or maintenance.

Outer shell 1, cathode electrode 2, anode electrode 3 and supporting ring 4 correspond to their counterparts in the embodiment shown in FIG. 1 as well as power connections 5 and 6. A pair of flanges 7, located at each end of the unit, secure the ion exchange column and the cathode unit. A flange 8 secures the anode unit. Thus each unit may be removed for inspection.

FIG. 3 shows the preferred arrangement for including the instant invention as an integral part of the apparatus for a continuous ion exchange unit as disclosed in said application Ser. No. 667,367. The advantage of locating the electrolytic unit in the leg opposite the input leg is that fresh resin is continuously supplied to the solution after all other cations are removed except those that require reduction prior to adsorption. In this fashion a maximum number of resin active sites are made available.

The following are examples of the process of the present invention:

Example I

An electrolytic cell was prepared consisting of an impervious graphite tube one meter in length, open at one end and fitted with a rubber stopper with a glass stopcock at the other end, and an impervious graphite rod, approximately the same length as the tube and centered therein. The tube was filled with a quantity of Dowex 50W–X8 ion exchange resin, strong acid, on the hydrogen cycle. The water on the resin was displaced with 35% phosphoric acid that had been heated to 85° C. This was then followed by 135 grams of 40% phosphoric acid which had been contaminated with cations of Fe, Ce, La, Sr, Nd, Y, Sm, Os and Ru by the repeated conversion of apatite into monocalcium phosphate in the acid and the subsequent removal of the monocalcium phosphate salt by filtration.

The Fe content was 0.2098 grams per 100 grams of solution and the entire quantity of Fe was in the +3 oxidation state.

As the above desired solution was percolated through the ion exchange resin bed, the graphite electrodes were connected to a direct current power source and a regulated current was allowed to flow between the outer cathode and the inner anode. When the entire quantity of solution had passed through the resin it was washed from the column with a quantity of 40% pure phosphoric acid and then by distilled water.

The resulting solution was tested for iron content and was found to be substantially iron-free.

Example II

The above experiment was repeated in every detail except for the Dowex 50W–X8 resin, an unidentified Wolfatite resin was substituted. Except for differing washing characteristics the analytical results were the same, complete removal of the Fe.

Example III

As a control, an equivalent amount of 40% phosphoric acid solution was passed through the graphite cathode/anode cell containing Dowex 50W–X8 but with no current passing through the circuit. The resulting solution contained 0.02098% Fe or approximately 85% of the Fe contained in the original solution. The entire quantity of Fe was determined to be in the +3 oxidation state.

It will thus be seen that the invention provides for the removal of cation contaminates from solutions by means of an ion exchange resin in which the cations have been reduced in oxidation state and to simultaneously remove the multivalent cations from acidic solutions by electrolysis without having them reduced to their metallic state.

Having thus described my invention, I claim:

1. A process forming phosphoric acid which comprises digesting a phosphate material with phosphoric acid to form a mother liquor solution containing monocalcium orthophosphate, electrolyzing said solution to reduce the valence state of ferric ions therein to the ferrous state, said electrolyzing being performed in the presence of a cationic ion exchange resin bed while passing the solution through said resin bed so that the ferrous ions are removed from the solution by the resin bed as they are formed.

2. The process as claimed in claim 1, wherein the steps of electrolyzing and removal of cations are performed simultaneously.

3. The process as claimed in claim 1, wherein said ion exchange resin is provided with a cathode electrode and an anode electrode and wherein a voltage is applied across said two electrodes in order to reduce said cations to a lower valence state.

4. The process as claimed in claim 3, wherein the voltage across said electrodes is constant.

5. The process as claimed in claim 1, wherein said resin is suspended in a pure acid of the substantially same concentration as the impure acid containing the cations to be reduced.

6. The process of claim 1, wherein the phosphate material is apatite.

References Cited

UNITED STATES PATENTS

| | | | |
|---|---|---|---|
| 2,288,752 | 7/1942 | Simpson | 204—90 |
| 2,938,849 | 5/1960 | Stoddard | 204—180P |
| 3,078,224 | 2/1963 | Schulze et al. | 210—38 |
| 3,084,113 | 4/1963 | Vallino | 204—180P |
| 3,367,849 | 2/1968 | Blade et al. | 204—195 |
| 3,374,055 | 3/1968 | Villalon | 23—107 |
| 3,485,737 | 12/1969 | Kakihana et al. | 204—180 |

TA-HSUNG TUNG, Primary Examiner

U.S. Cl. X.R.

23—105; 204—90, 112, 130, 180; 210—38